Nov. 27, 1923.
H. W. BUNDY
1,475,258
METHOD OF MANUFACTURING SOLDERED TUBE
Filed Sept. 21, 1922   2 Sheets-Sheet 1
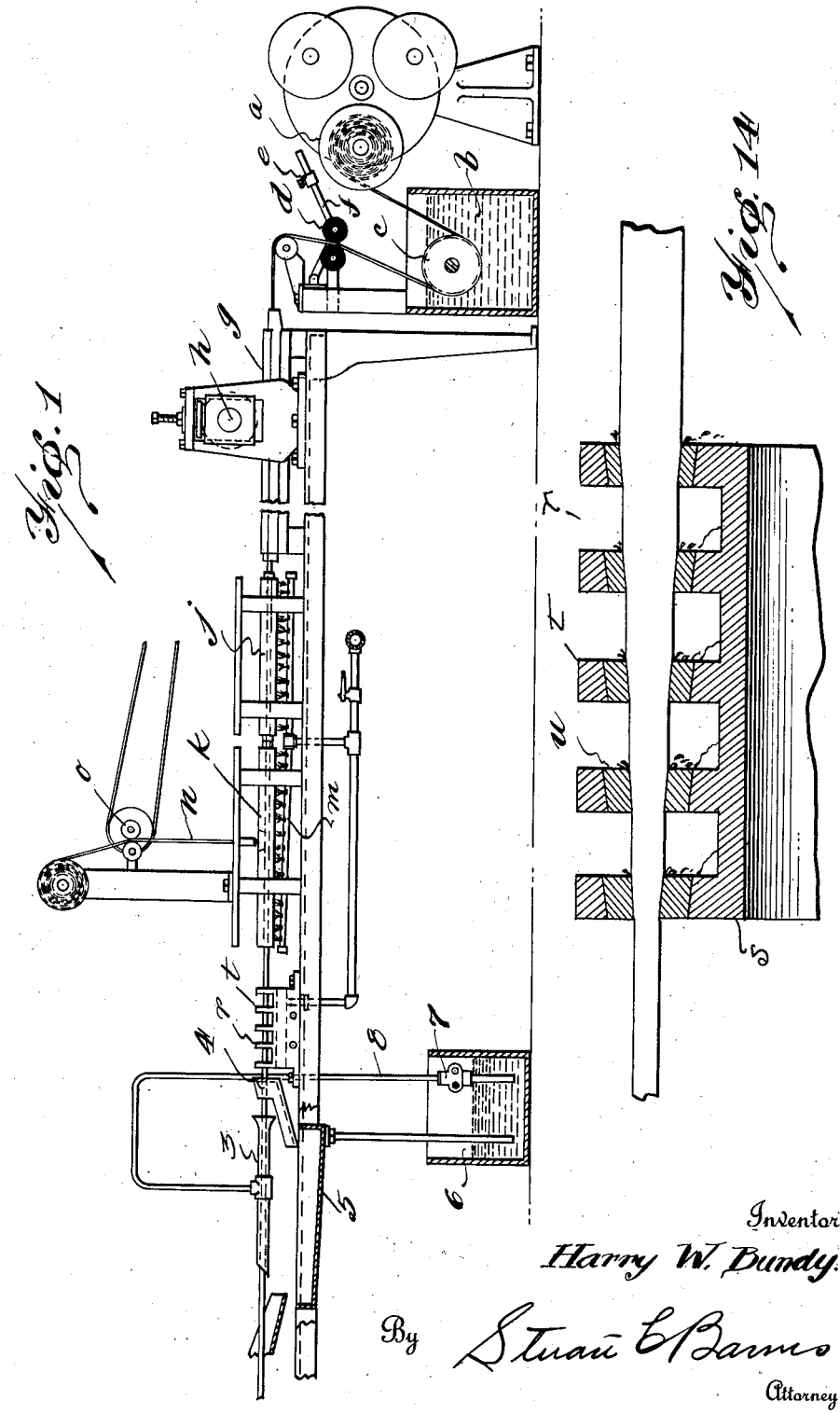
Inventor
*Harry W. Bundy.*
By *Stuart E. Barnes*
Attorney

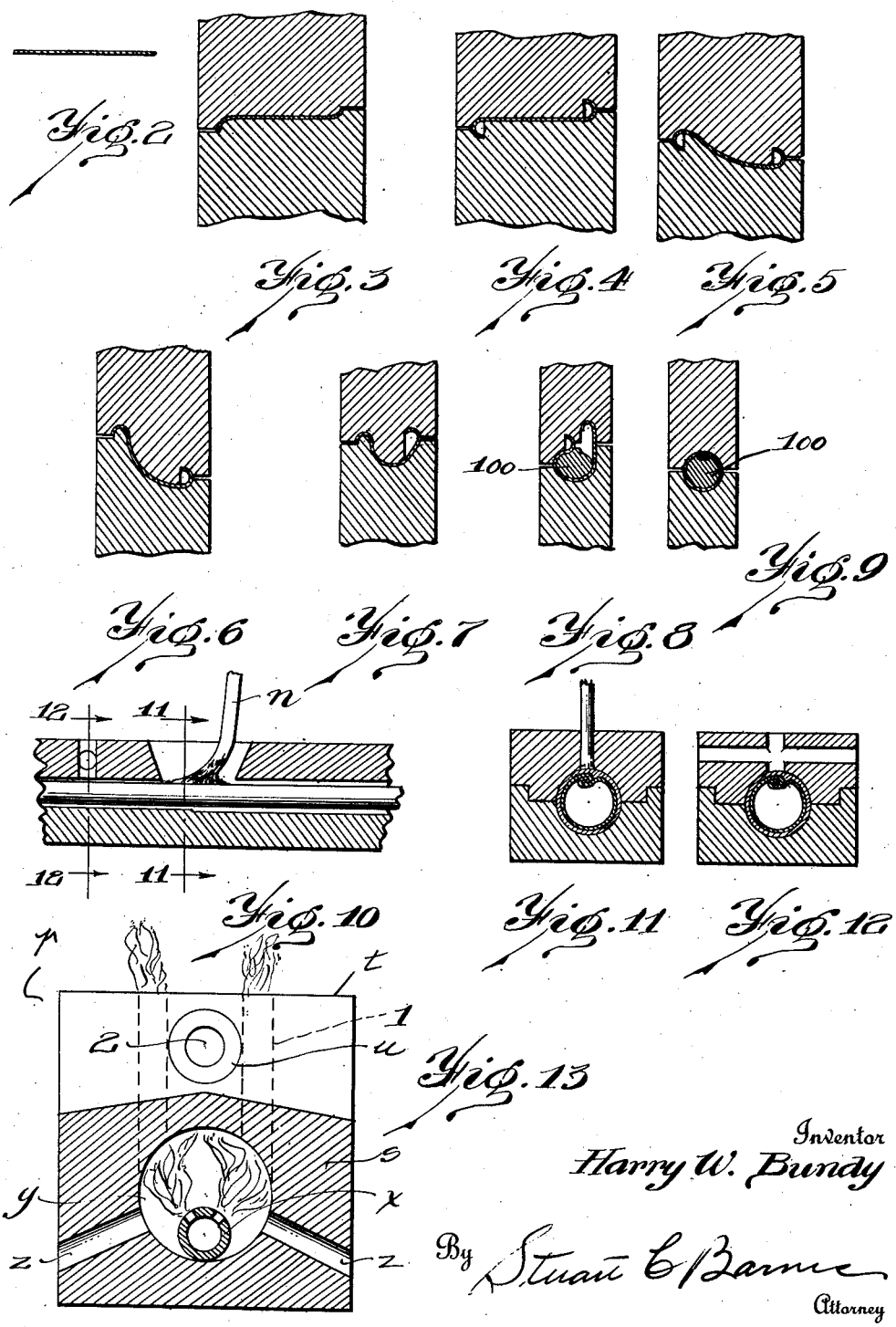

Patented Nov. 27, 1923.

1,475,258

UNITED STATES PATENT OFFICE.

HARRY W. BUNDY, OF DETROIT, MICHIGAN.

METHOD OF MANUFACTURING SOLDERED TUBE.

Application filed September 21, 1922. Serial No. 589,529.

*To all whom it may concern:*

Be it known that HARRY W. BUNDY, a citizen of the United States, residing at Detroit, in the county of Wayne and State of Michigan, has invented certain new and useful Improvements in Methods of Manufacturing Soldered Tubes, of which the following is a specification.

This invention relates to a method of forming tube. It is the object of the present invention to afford a method by which tubing can be solder-coated at least on the outside and the seam may be made liquid tight. The method is directed in particular to the manufacture of a lock seam radiator tubing but the broad aspects of the invention have a broader application than this.

The features of the method could best be understood after a detailed description has been given.

In the drawings:

Fig. 1 is a side elevation of the machine by which the method is practiced.

Fig. 2 is a cross section of the stock that is used.

Figs. 3 to 9 inclusive show a set of rolls by which, with the aid of a suitable mandrel, the tubing may be formed into a lock seam tube.

Fig. 10 is a longitudinal section of the heating die.

Fig. 11 is the cross-section on the line 11—11 of Fig. 10.

Fig. 12 is a cross-section on the line 12—12 of Fig. 10.

Fig. 13 is a cross-section of the scraping and reducing die.

Fig. 14 is a longitudinal section of the scraping and sizing die.

Lock seam tubing has already been used for radiators. This tubing has been soldercoated on the outside either by dipping the tubing in a solder bath after it has been installed in the radiator, or else by running the completed lock seam tubing through a bath of solder.

It is the object of the present invention to solder coat the tubing and seal the lock seam by first heating the tube and then both sweating it and flowing solder on to it at the seam and permitting the solder to flow around the entire tube while it is undergoing the final sweating operation. This will not only make tube faster, but result in a better product than by simply passing the tube through a bath of molten solder.

*a* designates a spool on which is mounted a strip of metal such as shown in Fig. 2. In the ordinary operations of the method this metal strip will not be solder or tin-coated although in the broad aspects of the invention either a tin-coated strip or a bare strip may be used. The strip first passes through a fluxing acid bath *b* under the roll *c* and up through the rolls *d* that are of rubber. The pressure of these rolls may be varied by altering the position of the slide *e* upon the arm *f*. This serves to wipe off the excess of the fluxing acid. The amount of fluxing acid left on the strip may be altered by changing the pressure of the rolls. The strip then passes through the dies *g* and the rolls *h* and over the mandril 100. The rolls and dies are only shown in part in Fig. 1 which is a broken view.

The roll shapes are shown in Figs. 3 to 9 inclusive. These are only intended to roughly approximate the roll shapes that could be used. The necessary dies and rolls for lock-seaming tubing are well known in this art and are shown in many prior patents, such for instance, as Webster, 950,163. Suffice it to say here that any arrangement of rolls and mandril or any arrangement of rolls, dies and mandril for shaping and lock-seaming the strip to form a tube may be utilized. No claim is made to the specific construction of the tube forming apparatus.

The tubing then passes through the heating dies *j* and *k*; two are here shown but one would be sufficient provided it were long enough and the heat were sufficient. I have here shown a gas burner *m* for affording the necessary heat but obviously hotter flames could be used and a shorter die employed. In sweating I find that the best results are achieved by applying the molten solder when the temperature of the tube has reached about 425 degrees Fahrenheit. The temperature of the heating die will have to be considerably higher than this to get this heat in the tube.

At a position along the heating die where under normal conditions the temperature of the tube will approximate 425 degrees Fahrenheit, I introduce solder to the seam and tube by flowing the same over the tube. This can be accomplished mechanically by feeding a solder strip *n* to the tube by means of power driven rolls *o*. The solder will easily melt when it comes within the zone of the heating die and the heated tube. The heating die has a slight clearance with respect to the tube that passes therethrough. This clearance is exaggerated in Figs. 10 to 12 inclusive. I prefer to employ a clearance of about 0.032 of an inch before the tube arrives at the place where the solder is flowed thereon. Beyond this point I prefer to use a clearance about 0.020 of an inch. I find that with the tube heated to a temperature of about 425 degrees, the solder will run with great facility. It will quickly flow around the entire tube and run into the seam in a way that no ordinary liquid will penetrate.

The tube passes from the heating die through the scraping and sizing die $r$. This is a block $s$ in the form of a casting provided with a plurality of fins $t$. Each of these fins carry a cast iron insert $u$ provided with an opening to size and scrape the tubing. This scrapes the excess solder off from the tubing and at the same time reduces and sizes the tube as shown in an exaggerated form in Fig. 14. This sizing and scraping die is kept hot by introducing a combustible gas through the perforated tube $x$, lying in the central opening $y$. Air is admitted through the air passages $z$. Vertical openings $l$ lead from the central passage up to either side of the tube passage opening 2. These vertical openings take the mixture of combustible gases and air and these may be ignited and the flame will keep the fins and block hot so that the dies can properly function. This die per se is not claimed in this application but in the co-pending application No. 588,339, September 15, 1922.

The tube then passes to the solder-setting device which here happens to be the water jacket 3. The water pours from this jacket on to the trough 4 and thence on to the tray 5 and down into the reservoir 6. The pump 7 serves to pump the water back through the pipes 8 to the water jacket. This water will be constantly warm due to the heat absorbed from the hot tube. This water both washes the tube clean and sets the solder.

What I claim is:

1. The method of manufacturing soldered tube which comprises the longitudinal moving of the tube in a substantially straight line and heating the moving tube to a relatively high heat independently of any heat derived from solder and then flowing a stream of solder onto the same and around the tube.

2. The method of manufacturing soldered tube comprising the moving of a tube longitudinally the heating of said tube to a high heat independently of any heat derived from solder and the flowing of a stream of solder derived from a melted strip of solder onto said tube and around said tube while so heated.

3. The method of manufacturing soldered tube comprising the moving of a tube longitudinally, the passing of said tube through a zone of relatively high heat and then passing the said tube through a second zone of relatively high heat and under a soldering strip which is thereby melted over the seam and caused to flow around the tube.

4. The method of manufacturing soldered tube which comprises the longitudinal moving of the tube through a heating die calculated to heat the tube to a soldering heat independently of heat derived from solder and then flowing a stream of solder onto the seam and around the tube.

5. The method of manufacturing soldered tube which comprises the moving of a tube longitudinally, the preheating of the tube to a relatively high temperature suitable for soldering and then for the first time presenting the tube to the solder.

6. The method of manufacturing soldered tube which comprises the moving of the tube longitudinally and preheating the tube to a relatively high temperature suitable for soldering by passing it through a relatively long heating zone and then for the first time while the tube is longitudinally moving and while the same is in such heated condition, presenting the same to a stream of melted solder.

7. The method of manufacturing soldered tube which comprises the moving of the tube longitudinally through substantially a straight path and passing the same through a zone of relatively high heat for preheating the tube to a temperature suitable for soldering and then for the first time presenting the tube while so longitudinally moving to the solder by flowing a stream of solder onto the tube and around the tube.

8. The method of making soldered tube which comprises the moving of strip stock longitudinally through a bath of fluxing fluid and then in a straight line through a heating zone where the tube is heated to approximately the high temperature necessary for soldering and flowing a stream of melted solder on to the said longitudinally moving tube while passing in said straight line.

9. The method of making soldered tube which comprises the moving of strip stock longitudinally in substantially straight line and while so moving forming the stock into a tube and passing the same into a preliminary heating zone where the tube is heated to substantially the soldering temperature and then flowing a stream of solder on the tube so preliminarily heated.

In testimony whereof I affix my signature.

HARRY W. BUNDY.